(12) United States Patent
Yao et al.

(10) Patent No.: US 12,569,061 B2
(45) Date of Patent: Mar. 10, 2026

(54) CONTROL DEVICE AND SANITARY EQUIPMENT

(71) Applicant: Kohler (China) Investment Co., Ltd., Shanghai (CN)

(72) Inventors: Dewang Yao, Shanghai (CN); Feipeng Lv, Shanghai (CN)

(73) Assignee: Kohler (China) Investment Co., Shanghai (CN)

( * ) Notice: Subject to any disclaimer, the term of this patent is extended or adjusted under 35 U.S.C. 154(b) by 0 days.

(21) Appl. No.: 18/164,065

(22) Filed: Feb. 3, 2023

(65) Prior Publication Data

US 2023/0255348 A1     Aug. 17, 2023

(30) Foreign Application Priority Data

Feb. 17, 2022   (CN) .......................... 202220324963.7

(51) Int. Cl.
*A47B 67/00*      (2006.01)
*F21V 23/04*      (2006.01)
(Continued)

(52) U.S. Cl.
CPC ............ *A47B 67/005* (2013.01); *F21V 23/04* (2013.01); *F21V 33/004* (2013.01); *G01B 7/16* (2013.01);
(Continued)

(58) Field of Classification Search
CPC .............................. A47B 67/005; F21V 33/004
See application file for complete search history.

(56) References Cited

U.S. PATENT DOCUMENTS

2013/0235607 A1 *  9/2013  Yang ....................... F21V 11/00
                                                            362/140
2014/0230575 A1 *  8/2014  Picciotto ................. G06F 3/016
                                                            73/862.626
(Continued)

FOREIGN PATENT DOCUMENTS

DE      202011108064 U1 *  4/2012  ........... E03D 13/005
KR      20160084752 A  *  7/2016  ............. A47B 7/005

OTHER PUBLICATIONS

Machine translation of DE 202011108064 U1 to Lauschke, Thomas, published Feb. 27, 2012 (Year: 2012).*

(Continued)

*Primary Examiner* — William N Harris
(74) *Attorney, Agent, or Firm* — Lempia Summerfield Katz LLC

(57)     ABSTRACT
Disclosed are a control device and a sanitary equipment. The control device comprises: a back plate and an outer plate, the outer plate is provided with a deformation control area, a circuit board is arranged between the outer plate and the back plate, a controller and a pressure sensor in communication connection with the controller are arranged on the circuit board, and the pressure sensor is arranged behind the deformation control area. The pressure sensor is arranged in the deformation control area, so that the pressure sensor detects deformation of the deformation control area, thus realizing control by pressing. Since the deformation control area is arranged on the outer plate, etching a key on other parts of the sanitary equipment may be avoided, and damage to other parts may be avoided, thus saving costs. The pressure-sensitive key is waterproof and dustproof, and has a long service life.

13 Claims, 6 Drawing Sheets

(51) Int. Cl.

| | |
|---|---|
| *F21V 33/00* | (2006.01) |
| *F21Y 115/10* | (2016.01) |
| *G01B 7/16* | (2006.01) |
| *G01L 5/00* | (2006.01) |
| *G02B 27/00* | (2006.01) |
| *H05B 3/84* | (2006.01) |

(52) U.S. Cl.
CPC ......... *G01L 5/0038* (2013.01); *F21Y 2115/10* (2016.08); *G02B 27/0006* (2013.01); *H05B 3/845* (2013.01)

(56) References Cited

U.S. PATENT DOCUMENTS

| | | | | |
|---|---|---|---|---|
| 2017/0303684 A1 * | 10/2017 | Chen | .................... | A47B 67/005 |
| 2018/0124521 A1 | 5/2018 | Giusti et al. | | |
| 2019/0374049 A1 * | 12/2019 | Gerig | ...................... | A47G 1/04 |
| 2020/0029689 A1 * | 1/2020 | Yao | .................... | F21V 23/0485 |
| 2021/0386198 A1 * | 12/2021 | Clouse | .................... | G02B 5/08 |

OTHER PUBLICATIONS

Machine translation of Gam, KR-20160084752-A, published Jul. 14, 2016 (Year: 2016).*
Search Report issued in corresponding European Application No. 23156795.9 on Jul. 10, 2023.

* cited by examiner

CONTROL DEVICE AND SANITARY EQUIPMENT

CROSS-REFERENCE TO RELATED APPLICATIONS

This application claims the benefit of the People's Republic of China National Utility Model Patent Application No. 202220324963.7, filed on Feb. 17, 2022, the entire disclosure of which being incorporated by reference herein, for all purposes.

TECHNICAL FIELD

This application relates to the technical field related to sanitary equipment, especially a control device and a sanitary equipment.

BACKGROUND

At present, conventional sanitary equipment on the market is provided with a touch key, and the touch key is usually arranged on a main body of the sanitary equipment. For example, a mirror cabinet is provided with the touch key on a mirror. Therefore, when a user touches the key, a fingerprint will be left on a surface of the main body of the sanitary equipment, which affects aesthetical appearance of the sanitary equipment. In addition, when there is a lot of water on a hand of the user, the touch may be ineffective. Meanwhile, for the mirror cabinet, etching the LOGO on the mirror may lead to a low yield of the mirror and a high cost.

SUMMARY

On this basis, it may be useful to provide a control device and a sanitary equipment/system/device aiming at the technical problems of ineffective touch of a key and a low yield in the prior art.

The application provides a control device, which comprises: a back plate and an outer plate, wherein the outer plate is provided with a deformation control area, a circuit board is arranged between the outer plate and the back plate, a controller and a pressure sensor in communication connection with the controller are arranged on the circuit board, and the pressure sensor is arranged behind the deformation control area.

A thickness of the deformation control area is smaller than that of other areas of the outer plate.

The back plate is a light-emitting back plate, the key is a hollow area, and the pressure sensor is arranged behind the hollow area.

The outer plate is an outer metal profiled plate or an outer plastic profiled plate.

The application provides a sanitary equipment/system/device, which comprises a sanitary equipment body and the control device fixed on the sanitary equipment body.

The sanitary equipment body is a mirror cabinet body, a toilet body, a faucet body, a bathtub body, a bathroom furniture body, a water purifier body, a bath heater body or a heater body.

The sanitary equipment body is a mirror cabinet body, the back plate of the control device may be configured as a cabinet door and hinged with the mirror cabinet body, a lower area of a front surface of the back plate is provided with the outer plate, and an upper area of the front surface of the back plate is provided with a mirror.

The sanitary equipment/system/device further comprises a magnetic sensor fixedly arranged on the back plate and a microwave distance sensor, wherein the magnetic sensor is in communication connection with the controller, and the microwave distance sensor is in communication connection with the controller.

The circuit board of the control device further comprises a control circuit electrically connected with a power supply module, an input end of the control circuit is in communication connection with the controller, and an output end of the controller is in communication connection with one or more execution parts of the mirror cabinet.

The execution part of the mirror cabinet comprises a first light-emitting diode light arranged on the front surface of the back plate and/or a second light-emitting diode light arranged on a back surface of the back plate; and/or a resistance wire anti-fog film mounted on a mirror surface.

As described herein, the pressure sensor is arranged in the deformation control area, so that the pressure sensor detects deformation of the deformation control area, thus realizing control by pressing. Since the deformation control area is arranged on the outer plate, etching the key on other parts of the sanitary equipment/system/device may be avoided, and damage to other parts might be avoided, thus saving costs. Meanwhile, the pressure-sensitive key is waterproof and dustproof, and has a long service life. On this basis, it may be useful to provide a control device and a sanitary equipment/system/device addressing the technical problems of ineffective touch of a key and/or a low yield in the prior art.

The application provides a control device, which comprises: a back plate and an outer plate, wherein the outer plate is provided with a deformation control area, a circuit board is arranged between the outer plate and the back plate, a controller and a pressure sensor in communication connection with the controller are arranged on the circuit board, and the pressure sensor is arranged behind the deformation control area.

A thickness of the deformation control area is smaller than that of other areas of the outer plate.

The back plate is a light-emitting back plate, the key is a hollow area, and the pressure sensor is arranged behind the hollow area.

The outer plate is an outer metal profiled plate or an outer plastic profiled plate.

The application provides a sanitary equipment/system/device, which comprises a sanitary equipment body and the control device fixed on the sanitary equipment body.

The sanitary equipment body is a mirror cabinet body, a toilet body, a faucet body, a bathtub body, a bathroom furniture body, a water purifier body, a bath heater body or a heater body.

The sanitary equipment body is a mirror cabinet body, the back plate of the control device may be configured as a cabinet door and hinged with the mirror cabinet body, a lower area of a front surface of the back plate is provided with the outer plate, and an upper area of the front surface of the back plate is provided with a mirror.

The sanitary equipment/system/device further comprises a magnetic sensor fixedly arranged on the back plate and a microwave distance sensor, wherein the magnetic sensor is in communication connection with the controller, and the microwave distance sensor is in communication connection with the controller.

The circuit board of the control device further comprises a control circuit electrically connected with a power supply module, an input end of the control circuit is in communication connection with the controller, and an output end of the controller is in communication connection with one or more execution parts of the mirror cabinet.

The execution part of the mirror cabinet comprises a first light-emitting diode light arranged on the front surface of the back plate and/or a second light-emitting diode light arranged on a back surface of the back plate; and/or a resistance wire anti-fog film mounted on a mirror surface.

According to the application, the pressure sensor is arranged in the deformation control area, so that the pressure sensor detects deformation of the deformation control area, thus realizing control by pressing. Since the deformation control area is arranged on the outer plate, etching the key on other parts of the sanitary equipment/system/device may be avoided, and damage to other parts may be avoided, thus saving costs. Meanwhile, the pressure-sensitive key is waterproof and dustproof, and has a long service life.

BRIEF DESCRIPTION OF DRAWINGS

The elements and other features, advantages and disclosures contained herein, and the manner of attaining them, will become apparent and the present disclosure will be better understood by reference to the following description of various examples of the present disclosure taken in conjunction with the accompanying drawings, wherein.

DETAILED DESCRIPTION

Figure 1:
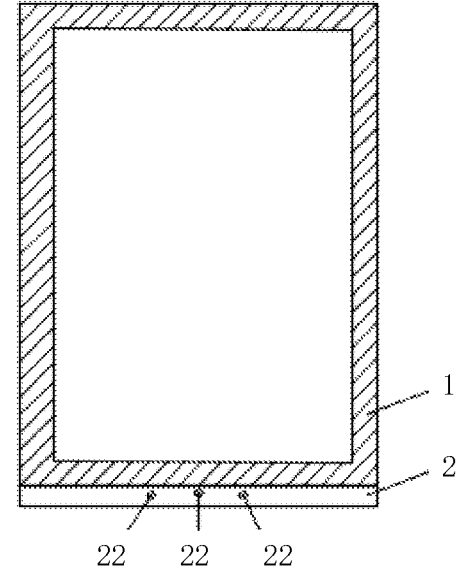
FIG. 1 is a front view of a sanitary equipment/system/device of the application.

For the purposes of promoting an understanding of the principles of the present disclosure, reference will now be made to the examples illustrated in the drawings, and specific language will be used to describe the same. It will nevertheless be understood that no limitation of the scope of this disclosure is thereby intended.

In one or more of the figures, the following Description of reference numerals may apply: 1—back plate; 2—outer plate; 21—deformation control area; 22—key; 3—circuit board; 31—controller; 32—pressure sensor; 33—power supply module; 34—control circuit; 4—mirror; 5—magnetic sensor; 6—microwave distance sensor; 7—first light-emitting diode light; 8—second light-emitting diode light; 9—resistance wire anti-fog film; 10—cabinet body; and 11—hinge.

One or more embodiments of the application are further described hereinafter with reference to the drawings. Same parts are denoted by same reference numerals. It should be noted that the terms "front", "back", "left", "right", "up" and "down" used in the following description refer to the directions in the drawings, and the terms "inner" and "outer" refer to the directions towards or far away from geometric centers of specific parts respectively.

Figure 2:
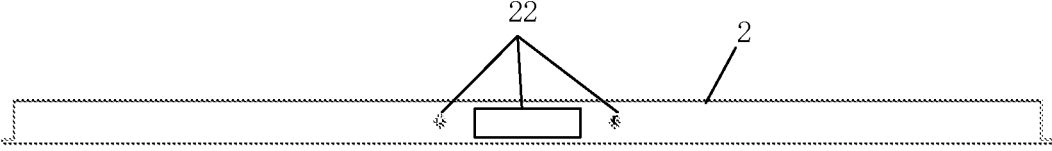
FIG. 2 is a front view of an outer plate in one or more embodiments of the application.
Figure 3:
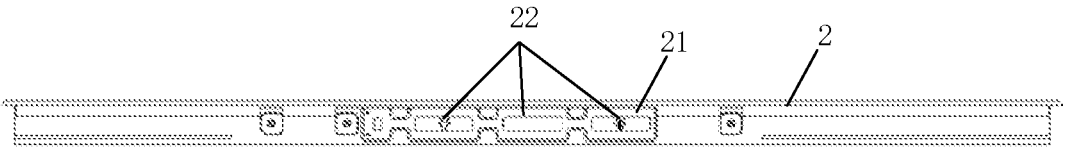
FIG. 3 is a rear view of the outer plate in one or more embodiments of the application.
Figure 4:
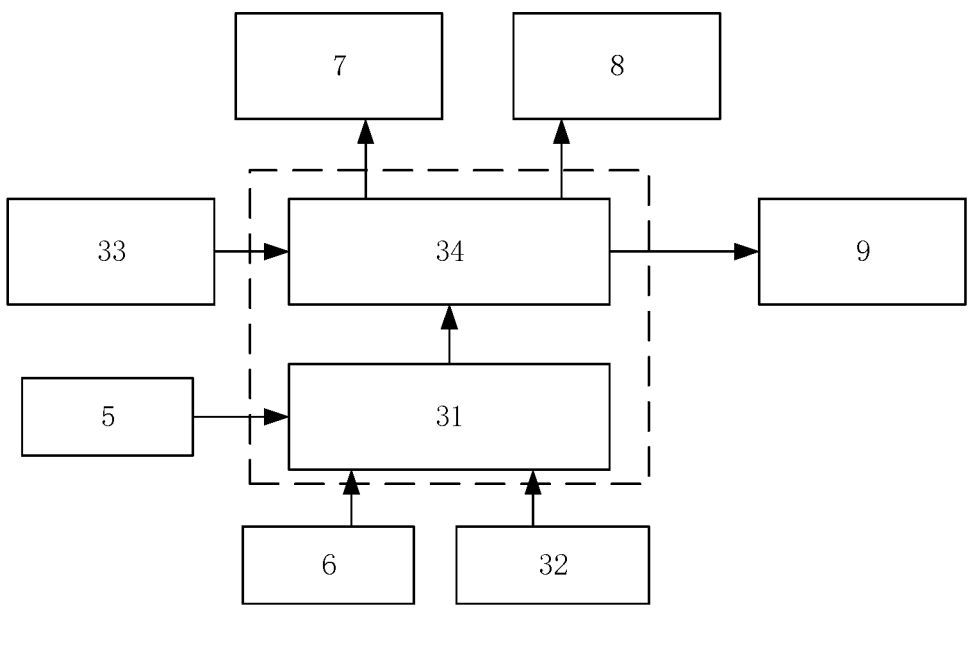
FIG. 4 is a schematic diagram of module connection of a circuit board in one or more embodiments of the application.

In at least a first embodiment, as shown in FIG. 1 to FIG. 4, a control device of the application comprises: a back plate 1 and an outer plate 2. The outer plate 2 is provided with a deformation control area 21, a circuit board 3 is arranged between the outer plate 2 and the back plate 1, a controller 31 and a pressure sensor 32 in communication connection with the controller 31 are arranged on the circuit board 3, and the pressure sensor 32 is arranged behind the deformation control area 21.

The outer plate 2 can be thin, and the deformation control area 21 is pre-defined on the outer plate 2. In one or more scenarios, the deformation control area 21 can be thinned. For example, a back side of an outer aluminum profiled plate is thinned by laser. The thin deformation control area 21 has a deformation capability, thus meeting a requirement of small deformation of a pressure-sensitive key. Then, the pressure sensor 32 is arranged in the deformation control area 21, a pressure is detected by the pressure sensor 32, and the controller 31 executes corresponding operations. Therefore, the deformation control area 21 realizes a key function.

Since the deformation control area 21 is arranged on the outer plate 2, etching the key on other parts of the sanitary equipment/system/device, such as glass, may be avoided, thus avoiding the glass from being damaged.

According to the application, the pressure sensor is arranged in the deformation control area, so that the pressure sensor detects deformation of the deformation control area, thus realizing control by pressing. Since the deformation control area is arranged on the outer plate, etching the key on other parts of the sanitary equipment/system/device, may be avoided, and damage to other parts may be avoided, thus saving costs. Meanwhile, the pressure-sensitive key is waterproof and dustproof, and has a long service life.

In at least a second embodiment, as shown in FIG. 1 to FIG. 4, a control device of the application comprises: a back plate 1 and an outer plate 2. The outer plate 2 is provided with a deformation control area 21, a thickness of the deformation control area 21 is smaller than that of other areas of the outer plate 2, a circuit board 3 is arranged between the outer plate 2 and the back plate 1, a controller 31 and a pressure sensor 32 in communication connection with the controller 31 are arranged on the circuit board 3, and the pressure sensor 32 is arranged behind the deformation control area 21. The back plate 1 is a light-emitting back plate, and a hollow area 22 is arranged in the deformation control area 21. The pressure sensor 32 is arranged behind the hollow area 22.

The outer plate 2 is an outer metal profiled plate or an outer plastic profiled plate. The outer plate 2 is an outer aluminum profiled plate.

The deformation control area 21 is thinned on a back side of the outer plate 2. For example, a back side of the aluminum profile is thinned by laser. Then, the hollow area 22 is hollowed by a punching technology, so that corresponding light below the hollow area 22 can penetrate through the outer plate. For example, the hollow area 22 is formed on the outer aluminum profile plate 2 by a laser micro-hole technology, so that corresponding light below the hollow area 22 can penetrate through the profile. A shape of the hollow area 22 may be set to be a key shape by punching.

The pressure sensor 32 is arranged corresponding to a position of the hollow area 22 in the thinned deformation control area 21 on the back side of the outer plate 2. When a user presses the hollow area 22, the controller 31 detects slight deformation of a surface of the outer plate 2 by the pressure sensor 32 to obtain a key value.

By thinning the deformation control area 21 on the back side of the outer plate 2, on one hand, a requirement of small deformation of the pressure-sensitive key is met, and on the other hand, a requirement of puncturing is met. For example, for the outer aluminum profiled plate, the thinned deformation control area 21 can meet the requirement of laser puncturing.

The material of the outer plate might not be limited to metal, but may also be wood, plastic, ceramic and other materials. The control device may be widely applied to various sanitary products. Applicable sanitary equipment/system/device comprise, but are not limited to: a mirror cabinet, a toilet, a faucet, a bathtub, bathroom furniture, a water purifier, a bath heater, a heater and other sanitary products.

In one or more scenarios, the deformation control area of the outer plate is thinned, and the key and the pressure sensor are arranged in the deformation control area, so that the pressure-sensitive key can be formed in the deformation control area by pressing control. Since the key is arranged on the outer plate, etching the key on other parts of the sanitary equipment/system/device may be avoided, and damage other parts may be avoided, thus saving costs. Meanwhile, the pressure-sensitive key is waterproof and dustproof, and has a long service life. Meanwhile, the hollow key can realize different light displays by using backlight.

In at least a third embodiment, a sanitary equipment/system/device of the application comprises a sanitary equipment body and the above said control device, wherein the control device is fixed on the sanitary equipment body.

In one or more scenarios, the sanitary equipment body is one or more of: a mirror cabinet body, a toilet body, a faucet body, a bathtub body, a bathroom furniture body, a water purifier body, a bath heater body or a heater body.

The sanitary equipment/system/device may be one or more of: a mirror cabinet, a toilet, a faucet, a bathtub, bathroom furniture, a water purifier, a bath heater, a heater and other sanitary products. The control device may be mounted on the mirror cabinet body, the toilet body, the faucet body, the bathtub body, the bathroom furniture body, the water purifier body, the bath heater body or the heater body corresponding to the mirror cabinet, the toilet, the faucet, the bathtub, the bathroom furniture, the water purifier, the bath heater, the heater and other sanitary products.

According to the application, the pressure sensor is arranged in the deformation control area, so that the pressure sensor detects deformation of the deformation control area, thus realizing control by pressing. Since the deformation control area is arranged on the outer plate, etching the key on other parts of the sanitary equipment/system/device may be avoided, and damage to other parts may be avoided, thus saving costs. Meanwhile, the pressure-sensitive key is waterproof and dustproof, and has a long service life.

Figure 5:
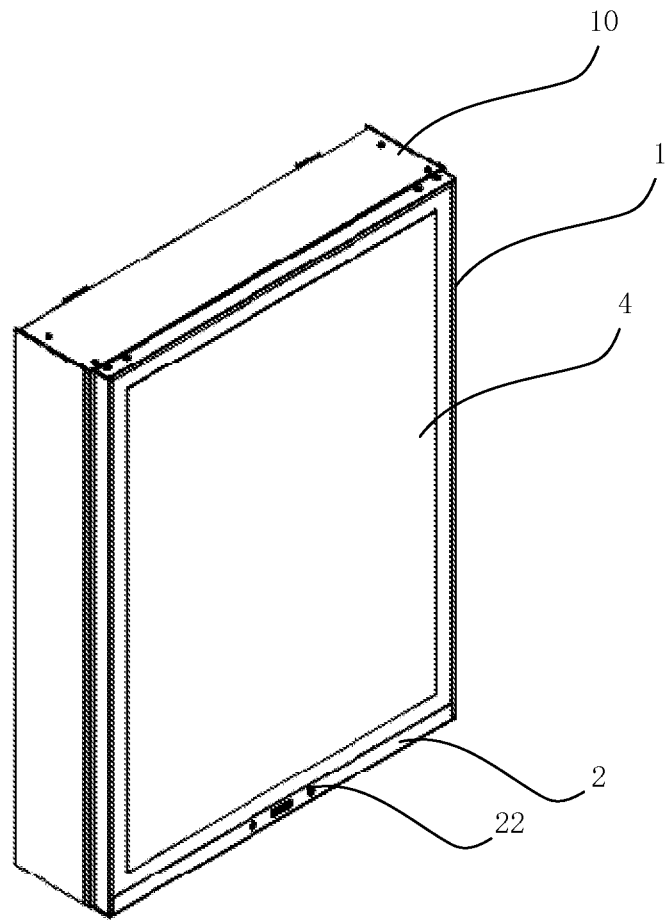
FIG. 5 is a schematic structural diagram of the sanitary equipment/system/device in one or more embodiments of the application.
Figure 6:
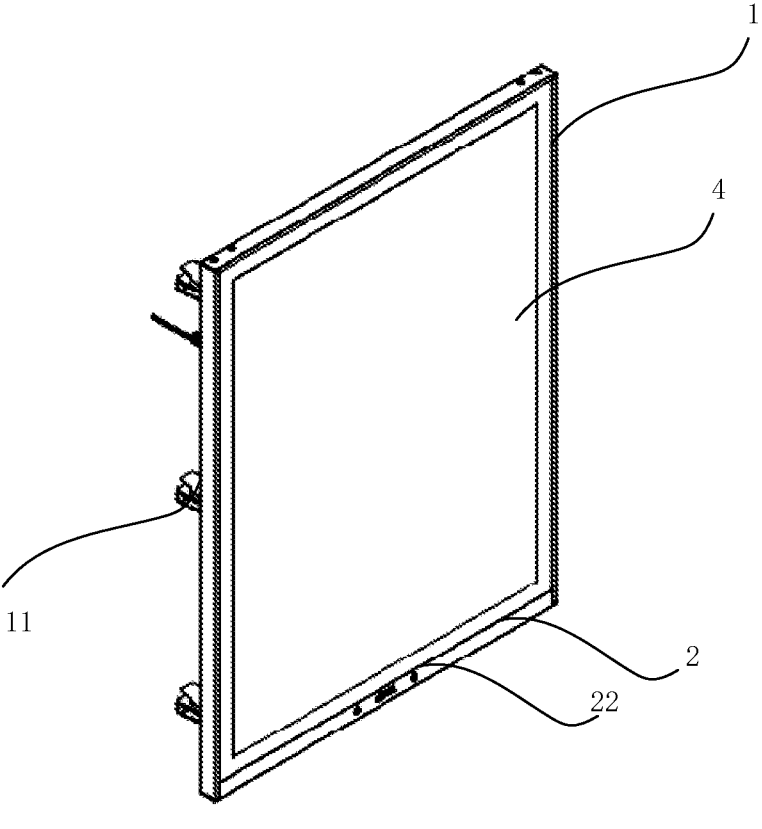
FIG. 6 is a schematic diagram from a front side of a cabinet door of the sanitary equipment/system/device in one or more embodiments of the application.
Figure 7:
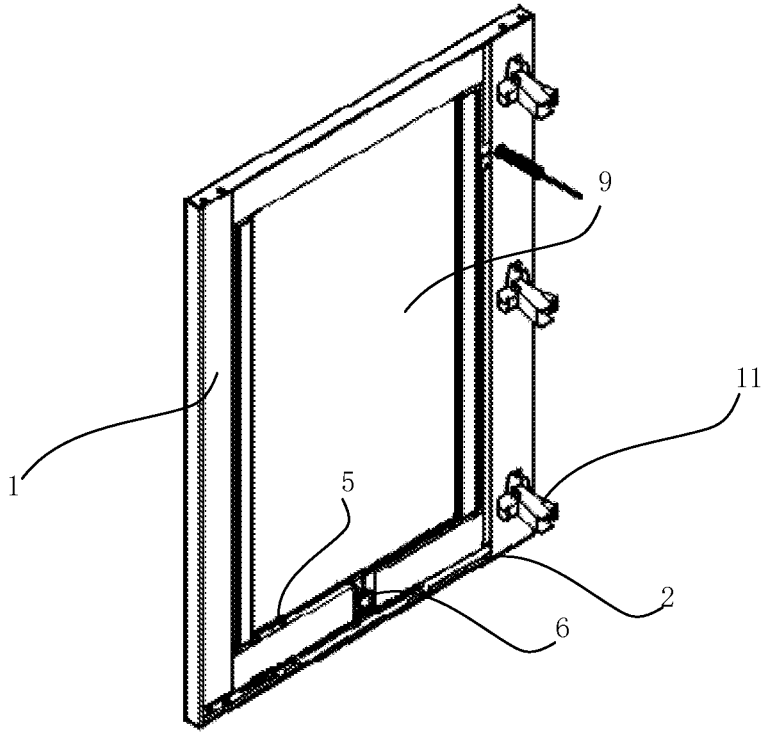
FIG. 7 is a stereoscopic diagram of a back side of the cabinet door of the sanitary equipment/system/device in one or more embodiments of the application.
Figure 8:
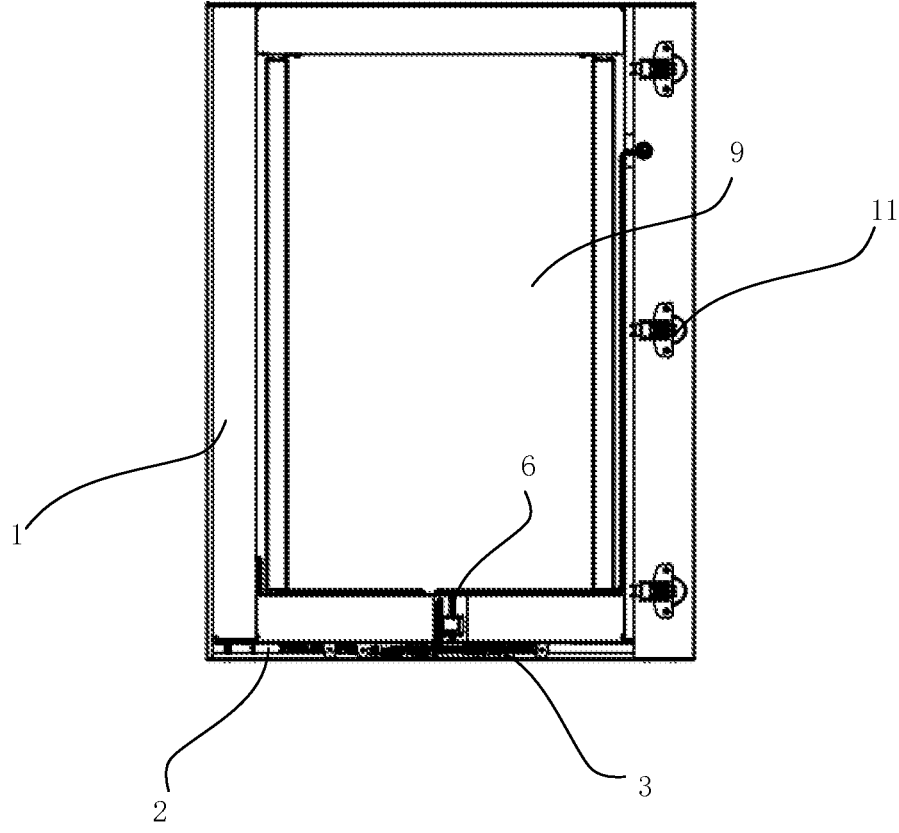
FIG. 8 is a schematic diagram from the back side of the cabinet door of the sanitary equipment/system/device in one or more embodiments of the application.

In at least a fourth embodiment, as shown in FIG. 1 to FIG. 8, a sanitary equipment/system/device of the application comprises a mirror cabinet body 10 and the control device above. The back plate 1 of the control device is used as a cabinet door and hinged with the mirror cabinet body 10, a lower area of a front side of the back plate 1 is provided with the outer plate 2, and an upper area of the front side of the back plate 1 is provided with a mirror 4.

The sanitary equipment/system/device further comprises a magnetic sensor 5 fixedly arranged on the back plate 1 and a microwave distance sensor 6 fixedly arranged on a back side of the back plate 1. The magnetic sensor 5 is in communication connection with the controller 31, and the microwave distance sensor 6 is in communication connection with the controller 31.

The circuit board of the control device further comprises a control circuit 34 electrically connected with a power supply module 33, an input end of the control circuit 34 is in communication connection with the controller 31, and an output end of the controller 31 is in communication connection with one or more mirror cabinet execution parts. The mirror cabinet execution part comprises a first light-emitting diode light 7 arranged on the front side of the back plate 1 and/or a second light-emitting diode light 8 arranged on the back side of the back plate 1; and/or a resistance wire anti-fog film 9 mounted on the mirror 4.

The back side of the back plate 1 faces inwardly towards the mirror cabinet body, and the front side of the back plate 1 faces outwardly. The back plate 1 is used as the cabinet door and hinged with the mirror cabinet body 10, such as hinging by a hinge 11. A lower area of the front side of the back plate 1 is provided with the outer plate 2, and an upper area is saved and provided with the mirror 4, thus constituting the sanitary equipment/system/device.

The hollow area 22 is arranged on the outer plate 2, so that etching the key on glass may be avoided, thus avoiding the whole glass from being damaged, and saving costs.

Meanwhile, the hollow area 22 is used as a control part and combined with the outer plate 2 formed from aluminum profile, so that the whole sanitary equipment/system/device forms an entirety and has an aesthetical appearance.

The outer plate 2 of the control device is made of aluminum profile. The back side of the aluminum profile is thinned by laser, and then corresponding light below the hollow area 22 can penetrate through the profile by a laser micro-hole technology.

The pressure sensor 32 is arranged in the area corresponding to the hollow area 22 of the deformation control area 21 with the thinned back side of the outer plate 2. When a user presses the hollow area 22, the controller 31 detects slight deformation of a surface of the outer plate 2 by the pressure sensor 32 to obtain a pressing value. Therefore, the controller 31 sends a corresponding control signal to the control circuit 34, and controls corresponding execution parts of the sanitary equipment/system/device to execute corresponding operations. Therefore, the hollow area 22 may be used as the key.

For example, one hollow area 22 is used as a brightening key, and another hollow area 22 is used as a dimming key. When the brightening key is pressed, the controller 31 sends a brightening signal to the control circuit 34, and controls the first light-emitting diode (LED) light 7 or the second light-emitting diode light 8 mounted on the light-emitting back plate to increase the brightness. When the dimming key is pressed, the controller 31 sends a dimming signal to the control circuit 34, and controls the first light-emitting diode light 7 or the second light-emitting diode light 8 to reduce brightness. Specific control circuit and control signal for dimming and brightening may be realized by existing light control circuit and method.

One or more embodiments may further comprise other inductor modules. The inductor modules are a magnetic sensor 5 and a microwave distance sensor 6 mounted on the back side of the back plate 1 of the sanitary equipment/system/device. The magnetic sensor 5 is used for detecting opening of a mirror door, and the controller 31 drives the control circuit 34 to control turning on or off of the LED light according to a signal of the magnetic sensor 5. The microwave distance sensor 6 is 24 G microwave induction and used for detecting whether there are people in front of the sanitary equipment/system/device, and the controller 31 drives the control circuit 34 to control turning on or off of the LED light according to a signal of the microwave distance sensor 6.

The controller 31 drives the control circuit 34 to control turning on and off of the resistance wire anti-fog film 9 according to pressing signals of various sensors or the hollow areas 22.

The control part is combined with the outer plate, so that the whole mirror cabinet forms an entirety and has an aesthetical appearance. A key area of the outer plate is thinned, and the key and the pressure sensor are arranged in the key area, so that the pressure-sensitive key can be formed in the key area by pressing control. Since the key is arranged on the outer plate, etching the key on the mirror surface of the mirror cabinet may be avoided, and damage to the glass may be avoided, thus saving costs. The pressure-sensitive key is waterproof and dustproof, and has a long service life. Pressure-sensitive control, magnetic control, distance control and other technologies are integrated on the sanitary equipment/system/device for controlling the LED light and the anti-fog film. The distance sensor is a microwave sensor, which has good concealment and a wide angle range, does not need to be punctured, and is not interfered by external light.

Three hollow areas 22 on the control part are respectively used as three keys, which may be distinguished by short pressing and long pressing, and are used for adjusting brightness and a color temperature of the LED light. The outer plate is made of the aluminum profile, and the key is a metal pressure-sensitive key. The metal pressure-sensitive key has the advantages of long service life, good anti-interference and integral forming.

The above embodiments describes several embodiments of the application, and the descriptions thereof are more specific and detailed, but cannot be understood as a limitation to the patent scope of the application. As described herein, one or more elements of any embodiment may be combined with one or more elements of one or more other embodiments. It should be noted that those of ordinary skills in the art may make a plurality of transformations and improvements without departing from the conception of the application, and these transformations and improvements shall all fall within the scope of protection of the application. Therefore, the scope of protection of the patent of the application shall be subjected to the claims appended.

What is claimed is:

1. A control device, comprising:
   a back plate and an outer metal plate;
   a circuit board arranged between the outer metal plate and the back plate;
   a controller and a pressure sensor in communication connection with the controller arranged on the circuit board; and
   a thinned deformation control area formed in the outer metal plate, the thinned deformation control area being a thinned portion of the outer metal plate having a deformation capability corresponding to the pressure sensor,
   wherein a hollow area is arranged in the thinned deformation control area and light can penetrate through the outer metal plate at the hollow area,
   wherein the pressure sensor is arranged behind the thinned deformation control area and the hollow area, and
   wherein a thickness of the thinned deformation control area is smaller than that of other areas of the outer metal plate.

2. The control device according to claim 1, wherein the back plate is a light-emitting back plate.

3. The control device according to claim 1, wherein the outer metal plate is: metal profiled plate.

4. A sanitary equipment device, comprising:
   a sanitary equipment body; and
   a control device fixed on the sanitary equipment body, the control device comprising:
   a back plate and an outer metal plate, wherein the outer metal plate is provided with a thinned deformation control area formed in the outer metal plate, the thinned deformation control area being a thinned portion of the outer metal plate having a deformation capability corresponding to a pressure sensor, a circuit board is arranged between the outer metal plate and the back plate, wherein a controller and the pressure sensor in communication connection with the controller are arranged on the circuit board, and the pressure sensor is arranged behind the thinned deformation control area,
   wherein the control device is further configured such that a thickness of the thinned deformation control area is smaller than that of other areas of the outer metal plate,
   wherein a hollow area is arranged in the thinned deformation control area and light can penetrate through the outer metal plate at the hollow area, and
   wherein the pressure sensor is disposed behind the hollow area.

5. The sanitary equipment device according to claim 4, wherein the sanitary equipment body is at least one of: a mirror cabinet body, a toilet body, a faucet body, a bathtub body, a bathroom furniture body, a water purifier body, a bath heater body, or a heater body.

6. The sanitary equipment device according to claim 4, wherein the sanitary equipment body is a mirror cabinet body, the back plate of the control device is configured as a cabinet door and hinged with the mirror cabinet body, a lower area of a front side of the back plate is provided with the outer metal plate, and an upper area of the front side of the back plate is provided with a mirror.

7. The sanitary equipment device according to claim 6, further comprising a magnetic sensor fixedly arranged on the back plate and a microwave distance sensor, wherein the magnetic sensor is in communication connection with the controller, and the microwave distance sensor is in communication connection with the controller.

8. The sanitary equipment device according to claim 6, wherein the circuit board of the control device further comprises a control circuit electrically connected with a power supply module, an input end of the control circuit is in communication connection with the controller, and an output end of the controller is in communication connection with one or more mirror cabinet execution parts.

9. The sanitary equipment device according to claim 8, wherein the one or more mirror cabinet execution parts comprises:
   a first light-emitting diode light arranged on the front side of the back plate; and
   a second light-emitting diode light arranged on a back side of the back plate.

10. The sanitary equipment device according to claim 4, wherein the control device is further configured such that the back plate is a light-emitting back plate.

11. The sanitary equipment device according to claim 4, wherein the outer metal plate is metal profiled plate.

12. A control device, comprising:

a back plate and an outer metal plate, wherein the outer metal plate is provided with a thinned deformation control area formed in the outer metal plate, the thinned deformation control area being a thinned portion of the outer metal plate;

a hollow area arranged in the thinned deformation control area;

a circuit board arranged between the outer metal plate and the back plate;

a controller and a pressure sensor in communication connection with the controller arranged on the circuit board, wherein the pressure sensor is arranged behind the thinned deformation control area and the hollow area and is pressed by the thinned deformation control area, and wherein light can penetrate through the outer metal plate at the hollow area.

13. The sanitary equipment device according to claim 8, wherein the one or more mirror cabinet execution parts comprises a resistance wire anti-fog film mounted on the mirror.

\* \* \* \* \*